(12) United States Patent
Aghilone

(10) Patent No.: US 9,714,647 B2
(45) Date of Patent: Jul. 25, 2017

(54) AIR-COMPRESSING DEVICE FOR A CYCLE

(71) Applicant: Marcello Aghilone, Pezenas (FR)

(72) Inventor: Marcello Aghilone, Pezenas (FR)

(73) Assignees: Marcello Aghilone, Pezenas (FR); TECHNOFLUID ENGINEERING S.R.L., Cesano Maderno (IT)

( * ) Notice: Subject to any disclaimer, the term of this patent is extended or adjusted under 35 U.S.C. 154(b) by 405 days.

(21) Appl. No.: 14/356,382

(22) PCT Filed: Nov. 23, 2012

(86) PCT No.: PCT/FR2012/052706
§ 371 (c)(1),
(2) Date: May 5, 2014

(87) PCT Pub. No.: WO2013/076429
PCT Pub. Date: Mar. 30, 2013

(65) Prior Publication Data
US 2014/0322031 A1 Oct. 30, 2014

(30) Foreign Application Priority Data

| Nov. 23, 2011 | (FR) | 11 03575 |
| May 3, 2012 | (FR) | 12 54073 |
| Jun. 7, 2012 | (FR) | 12 55327 |

(51) Int. Cl.
*F04B 33/00* (2006.01)
*F04B 33/02* (2006.01)
(Continued)

(52) U.S. Cl.
CPC .......... *F04B 33/005* (2013.01); *B60C 23/006* (2013.01); *B60C 23/10* (2013.01); *B60C 23/14* (2013.01); *F04B 33/02* (2013.01)

(58) Field of Classification Search
CPC .......... F04B 33/005; F04B 33/02; F04B 1/02; F04B 25/005; F04B 35/01; F04B 35/06;
(Continued)

(56) References Cited

U.S. PATENT DOCUMENTS

| 1,417,677 A | * | 5/1922 | Manny | F04B 33/005 417/265 |
| 5,318,317 A | * | 6/1994 | Hopper | B60C 23/105 152/416 |

FOREIGN PATENT DOCUMENTS

| EP | 0507007 a1 | 10/1992 | |
| ES | WO 9622216 A1 * | 7/1996 | B62J 1/06 |

(Continued)

*Primary Examiner* — Charles Freay
*Assistant Examiner* — Kenneth J Hansen
(74) *Attorney, Agent, or Firm* — Andrew W. Chu; Craft Chu PLLC

(57) ABSTRACT

The air-compressing device for a cycle has a crank set. The device includes at least one cartridge for storing compressed air, and a compressor, connected to the cartridge. The compressor includes a device for engaging with the crank set and a first and a second compression chamber, each chamber provided with an air piston. The device for engaging is connected to each piston and translatably drives the stroke of each piston so as to carry out compression in the respective chamber. The first chamber is connected to the second chamber so as to transfer the compressed air within the first chamber to the second chamber when compression is being carried out in the latter.

9 Claims, 3 Drawing Sheets

(51) Int. Cl.
*B60C 23/00* (2006.01)
*B60C 23/14* (2006.01)
*B60C 23/10* (2006.01)

(58) Field of Classification Search
CPC ... B60C 23/001; B60C 23/005; B60C 23/006; B60C 23/10; B60C 23/14; B60C 23/16; F04D 9/001
USPC .......... 417/265, 267, 268, 460; 152/416–426
See application file for complete search history.

(56) References Cited

FOREIGN PATENT DOCUMENTS

| | | | |
|---|---|---|---|
| FR | 459989 | A | 11/1913 |
| FR | 2624085 | A1 | 6/1989 |
| WO | 9622216 | A1 | 7/1996 |

\* cited by examiner

AIR-COMPRESSING DEVICE FOR A CYCLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention is related to the field of compression and storage of compressed air. More particularly, the invention is applied to bicycles by using the pedaling motion for compressing and storing the compressed air for subsequent use.

2. Description of Related Art Including Information Disclosed Under 37 CFR 1.97 and 37 CFR 1.98

In a known way, the inflation of the inner tube of the wheels of a bicycle is carried out manually by pumping using a pump in the form of a piston. This operation is time-consuming and physically strenuous. In order to facilitate this inflation operation, cartridges containing compressed air permit to inflate quickly and effortlessly the inner tube. However, once emptied, the cartridge becomes unusable until it is recharged or replaced.

Based on this observation, it was devised to use the pedaling motion when using the bicycle in order to compress and store compressed air, which will subsequently be used for inflating the inner tubes.

A solution that was contemplated consisted in using the very frame of the bicycle, comprised of hollow tubes welded together, in order to form compressed-air tanks. FR 2624085 and FR 459 989 disclose the use of at least one segment of a tube forming the frame, which is made tight in order to serve as a compressed-air tank. This segment is provided with an aperture, in which is mounted a valve permitting to fill and extract compressed air. Furthermore, a pressure gauge can be mounted at the level of this segment, in order to indicate the pressure and thus the amount of air contained in this tank.

The major drawback of this solution lies in the filling of the frame, which must be performed by an external air-compression system. In addition, the frame must be entirely dedicated to this purpose and is therefore not compatible with all types of bicycle.

WO 96/22216 tries to cope with this drawback by adding air-compression means actuated by pedaling, yet in order to fill an airtight container formed of part of the bicycle frame. More particularly, the compression means are formed of one single piston hinged with the crank set of the bicycle, forming a cam according to a mechanical crank system, so as to convert the rotation of the crank set into a translational motion of said piston, in order to fill the integrated tank.

Besides the drawback of using here too the frame as a tank, this solution raises a major technical problem: the force required to actuate the piston in order to compress the air to a sufficient pressure, higher than 10 bars (1,000,000 Pa), is too high and therefore creates too much resistance to the pedaling for the cyclist. In addition, such a compression force would require a piston with a too large length or a too large diameter. Finally, the compression forces would result into too high thermal stress, in particular into a heating of the piston likely to damage and burn the user.

EP 0507007 discloses yet another air-compression system using the rotation of the crank set to actuate a piston and to fill a compressed-air tank, but for serving as pneumatic power in order to facilitate the pedaling motion, namely on an upward slope. The single piston raises the same problems as described above, making this kind of system technically unfeasible.

SUMMARY OF THE INVENTION

The present invention aims at coping with the drawbacks of the prior art by providing an air-compression device for a bicycle, using at least two compression pistons, a "low pressure" and a "high pressure" one, the compressed air within the low-pressure piston being transferred into the high-pressure piston in order to facilitate its compression.

Thus, such a device cooperates with a crank set said bicycle is provided with and comprises at least one compressed-air storage cartridge and compression means connected to said cartridge and comprised of:
  means for gearing with said crank set, and
  at least a first and a second compression chamber, each provided with an air piston, wherein said gearing means are connected to each piston and drive their translation stroke in order to put their respective chamber under compression,
and in that said first chamber is connected to said second chamber so as to transfer the compressed air within this first chamber to said second chamber during the compression of the latter.

Such a solution with two, or more, pistons permits to reduce the force required for the compression in order to achieve air compressed at several tens of bars, in particular between 25 and 35 bars. Moreover, the use of two pistons reduces the thermal stresses due to the compression forces and distributes them over each one of them.

Furthermore, according to other additional features, said gearing means can comprise at least one first wheel for driving said first piston and at least one second wheel for driving said second piston, said wheels being mounted and rotated by a wheel gearing with said crank set, each piston being mounted articulated eccentrically with its respective driving wheel so as to constitute mechanical rod-crank systems.

Preferably, said gearing means can comprise a gearing disc provided with means for fastening to said crank set, said disc being crenellated in the form of a toothing of shapes and dimensions complementary to the toothing said gearing wheel is provided with.

According to one embodiment, said device can comprise means for controlling the gearing coupling of said coupling wheel with said disc and permitting to manually engage or disengage said coupling.

According to another embodiment, said control means can comprise means for measuring the internal pressure of said cartridge, controlling automatically the disengagement of said coupling beyond a determined threshold.

Furthermore, said first chamber can comprise such dimensions that the compressed-air pressure is lower than the pressure of the air compressed by said second chamber.

In addition, the first chamber can be connected to the second chamber through a check valve permitting the compressed air to pass only from said first chamber to said second chamber.

According to another embodiment, said gearing wheel can be in the form of one single wheel having a specific and complementary shape, so as to cooperate directly in gear with the toothing of said plate, the teeth of said wheel being oblong, such as lobes.

According to a similar, but different embodiment, said gearing wheel can be in the form of a wheel having a toothing, which a small chain with links wound around said wheel cooperates with.

Further features and advantages of the invention will become clear from the following detailed description of non-restrictive embodiments of the invention, with reference to the attached figures.

DETAILED DESCRIPTION OF THE DRAWINGS

Figure 1:
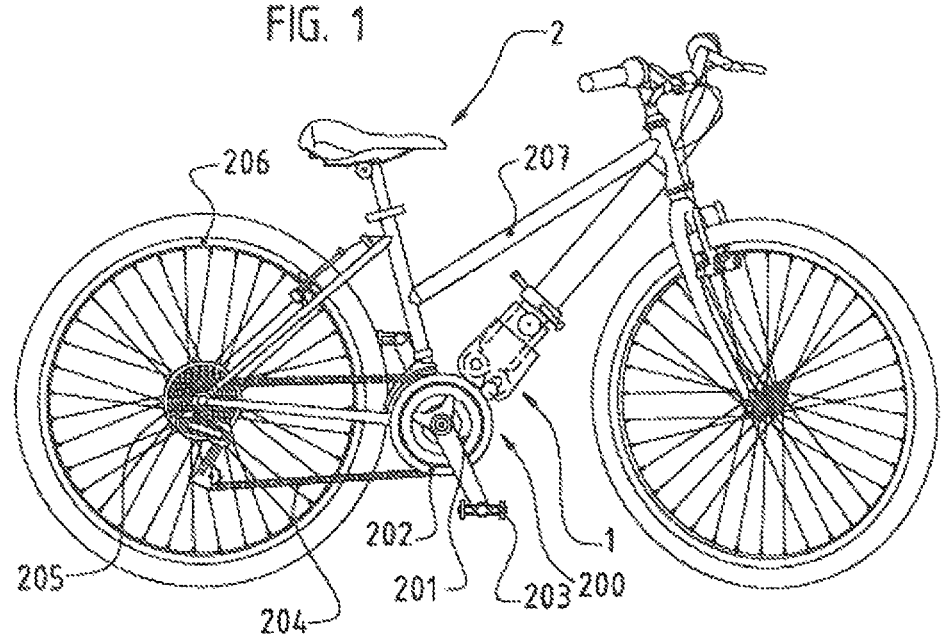
FIG. 1 represents an overall schematic view of an embodiment of the compression device gearing with the crank set of a bicycle.

The present invention relates to an air-compression device 1 for a bicycle 2.

In particular, such a device 1 uses the pedaling for compressing air in order to store it for subsequent use, namely for inflating the inner tube of a wheel, but also for supplying air to an air damper system, which said bicycle 2 is eventually provided with.

In this respect, the bicycle 2 is provided with a drive crank set 200 comprised of at least one plate 201 rotatably mounted with respect to the frame 207 about an axis 202 integral with the pedals 203. In a known way, pressing on the pedals 203 causes the rotation of the axis 202 and the plate 201, which by means of a gearing system with a chain 204 actuates at least one pinion 205 integral with the rotatably mounted rear wheel 206, permitting the bicycle 2 to drive forward.

The compression device 1 according to the invention adapts itself to the propulsion system of the bicycle 2, at the level of the crank set 200, in order to cooperate with the latter in gearing and to use its rotation during the pedaling in order to compress air.

Figure 2:
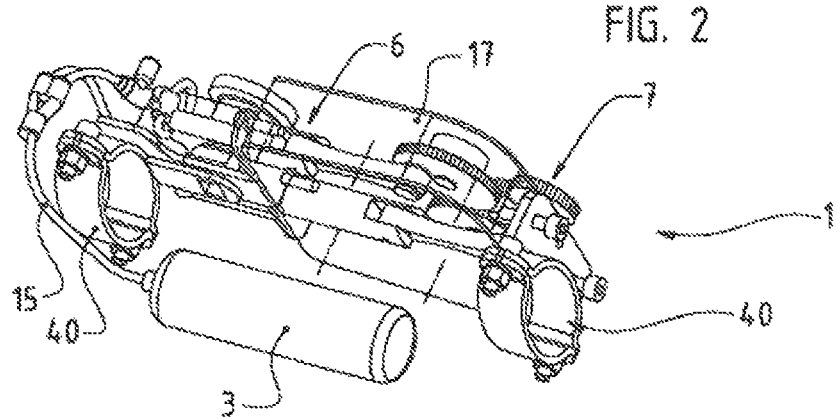
FIG. 2 schematically represents a perspective view of the device alone according to a first embodiment.

To this end, said device 1 comprises at least one compressed-air storage cartridge 3. As can be seen in FIG. 2, the cartridge 3 can be in the form of an airtight tank with a cylindrical shape, provided at one end with an air inlet and outlet aperture, ensuring respectively its filling and emptying.

Advantageously, said device 1 can be provided removable from the frame 207 of said bicycle 2.

Figure 3:
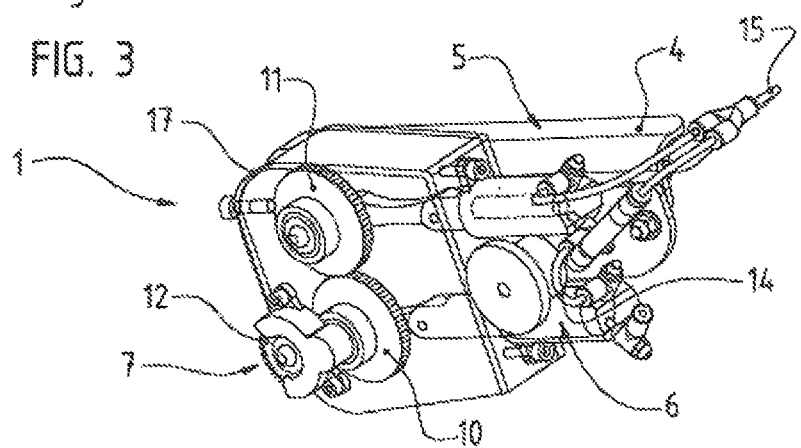
FIG. 3 schematically represents a view emphasizing by transparency the mechanism of said device, without its compressed-air storage cartridge, according to said first embodiment.

According to a first embodiment, represented in FIG. 3, the device 1 can be mounted on a platelet 4 provided with two through-holes 5, in order to permit the passing through of screws (not shown), which cooperate with the internal threads provided for within the frame 207 of the bicycle 2, in a standard way for receiving various components, such as for example the bottle-holder.

It should be noted that the holes 5 can be provided oblong, in order to be adapted to different distances between said internal threads.

Figure 4:
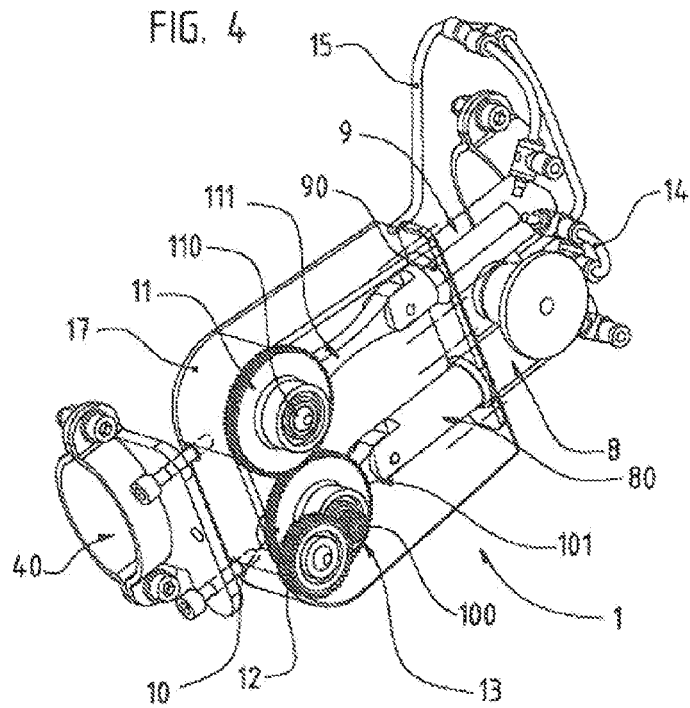
FIG. 4 schematically represents a view showing by transparency the mechanism of said device, without the compressed-air storage cartridge, according to another embodiment.
Figure 5:
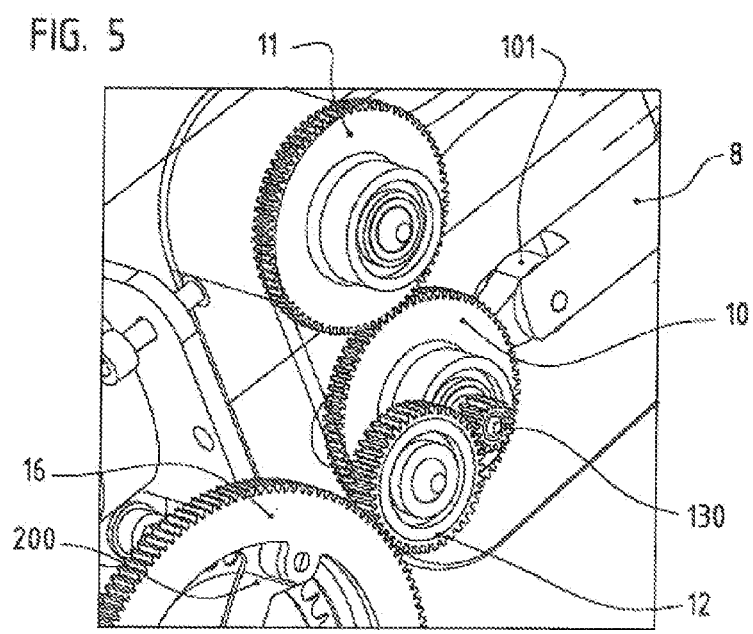
FIG. 5 schematically represents a detail view of the gearing of said device with the crank set of said bicycle according to the embodiment of FIG. 4.

According to another embodiment, represented in FIGS. 2 and 4, two rings 40 being in the form of two half-circles, cooperating through screwing at each end thereof, ensure the device 1 will remain fixed by clasping of the tubes of the frame 207 of the bicycle 2.

Thus, the device 1 can easily be removed, preventing its theft. Moreover, according to the second embodiment, it can be positioned accurately and in different types of frames with a tubular cross-section.

Figure 7:
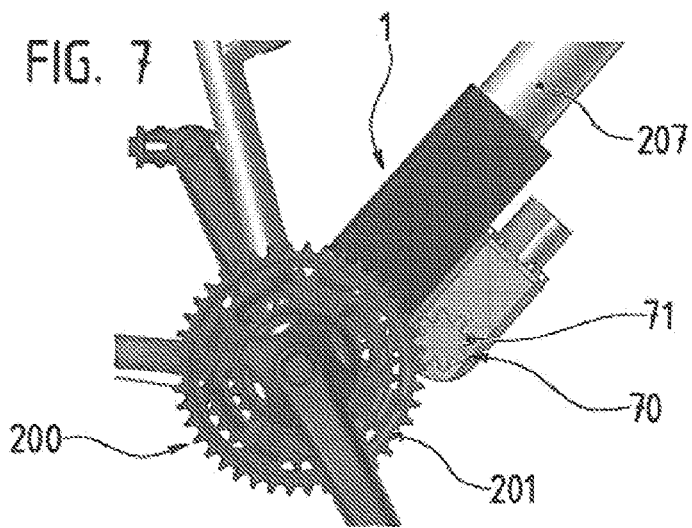
FIG. 7 represents a schematic view similar to FIG. 6 of the device in a position coupled to a crank set.
Figure 8:
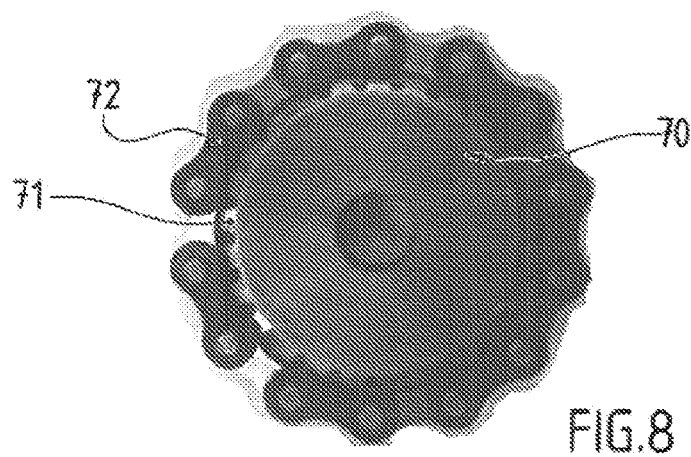
FIG. 8 represents a schematic view of yet another embodiment of a detail of the device.

Furthermore, said device 1 can be surrounded by a protective jacket or casing having a substantially rectangular shape, namely with rounded corners and edges, as can be seen in FIGS. 7 and 8. Such a casing can have a removable or hinged face so as to have access to the inside in order to fix the device 1 on the bicycle 2, for its maintenance or for removing the cartridge 3.

In this respect, said cartridge 3 can also be mounted removably with respect to the device 1, through a quick-release fastener, namely a snap-on or a springy lock, so as to permit its positioning and especially its extraction in order to be quickly and easily handled, namely during the inflation operation. Thus, the removability of this cartridge 3 permits a user to inflate the wheels of its own bicycle 2, but also those of another bicycle, namely of a person who accompanies him.

Advantageously, said device 1 comprises compression means 6 connected to said cartridge 3. These means 6 consist of at least means 7 that enter into gear with said crank set 200 and at least a first 8 and a second 9 compression chamber, each provided with an air piston, namely a first piston 80 and a second piston 90 sliding inside each chamber 8, 9.

More particularly, said gearing means 7 are connected to each piston 80, 90 and cause them to move in translation, so as to compress their respective chamber 8, 9.

According to a particular embodiment, represented in the figures, said first chamber 8 comprises dimensions such that the compressed-air pressure is lower than the pressure of the air compressed in said second chamber 9. In short, the first piston 80 has a lower compression than the second piston 90.

Preferably, said first piston 80 with its chamber 8 can have a larger diameter than the second piston 90 with its chamber 9, for an identical stroke. By way of a non-restrictive example, said first piston 80 has a diameter of 18 mm, while the second piston 90 has a diameter of 8 mm, for an identical length.

Thus, the force required for compressing the first piston 80 must be smaller than the force required for compressing the second piston 90. According to the foregoing data, the first piston 80 compresses the air to a pressure of about 26 bar, while the second piston compresses the air to a pressure higher than or equal to 25 bar, namely between 25 and 35 bars, preferably between 26 and 35 bars. The first piston 80 is therefore a piston for a lower pressure than the second piston 90.

Advantageously, in order to permit the compression of the second piston 90 with a higher pressure, the device 1 provides for transferring compressed air from the first chamber 8 to the second chamber 9 during the compression of the latter. To this end, said first chamber 8 is connected to said second chamber 9. In brief, the lower force required to compress the air within the first chamber 8 permits to partly fill the second chamber 9 and thus to reduce the force necessary for compressing the second chamber 9.

More specifically, in operation, the pistons 80 and 90 can be phase shifted. In other words, the translation of the first piston 80 within its chamber 8 is offset with respect to the translation of the second piston 90 within its chamber 9. This offset ensures that the compression of the first piston 80 starts or is in progress, or can even be completed, when the compression of the second piston starts or is in progress.

According to the preferred embodiment, the compression of the first piston 80 ends when the compression of the second piston 90 starts. To this end, the pistons 80 and 90 are shifted by 180 degrees with respect to the gearing means 7.

It should be noted that said first chamber 8 is connected to the second chamber 9 through at least one channel 14, namely in the form of a hose, connected in a tight way to the end of each compression chamber 8, 9.

Moreover, the first chamber 8 can be connected to the second chamber 9 through a check valve, permitting only the passing through of compressed air from said first chamber to said second chamber 8, 9, avoiding any reflux.

Furthermore, said second chamber 9 is connected to said cartridge 3 through at least one similar channel 15. Connections are made in a tight way and can also include a check valve permitting the compressed-air flow to circulate only from the second chamber 9 to the cartridge 3. In addition, the connection between the channel 15 and the cartridge 3 can be made in a removable way, namely by screwing, and in a tight way, namely with a seal, for example such as an O-ring. A manually or automatically actuated valve can control the opening or closing of the cartridge. It is thus possible to remove the cartridge 3 in order to use it at another location, by connecting it to the valve to an inner tube 2 of the bicycle or of another bicycle, to a damper or the like.

Advantageously, according to the preferred embodiment, said gearing means 7 comprise at least one first wheel 10 for driving said first piston 8 and at least one second wheel 11 for driving said second piston 9. Moreover, said wheels 10, 11 are rotatably mounted and driven by a wheel 12 coming into gear with said crank set 200. In brief, said gearing wheel 12 is driven in rotation by said crank set 200 and transmits its rotational movement to each of said wheels 10 and 11.

Preferably, according to the embodiments shown in FIGS. 2 to 5, the transmission between the gearing wheel 12 and the driving wheels 10 and 11 occurs through a multiplier 13 permitting to accelerate the speed of rotation of the wheels 10 and 11 at the outlet with respect to the gearing wheel 12 at the inlet.

According to the preferred embodiment, said multiplier is in the form of a knurled wheel 130 of a smaller diameter integrally mounted about the axis of rotation 100 of the driving wheel 10 of the first piston 80.

In addition, the driving wheel 11 is rotatably mounted about an axis 110 extending parallel to the axis 100, said wheel 11 cooperating in gearing with the driving wheel 10.

It should be noted that, according to the preferred embodiment, said wheels 10 and 11 have an identical diameter and rotate at the same speed. According to other embodiments, said wheels may have different diameters, changing the relative rotational speed with respect to each other.

Furthermore, each piston 8, 9 is mounted in a hinged way, eccentrically with its respective driving wheel 10, 11 so as to constitute mechanical rod-crank systems. This kind of system operates as a cam and converts the rotational movement of the wheels 10, 11 into a translation movement of the pistons 8, 9.

According to the embodiment shown in the figures, each piston 8, 9 is connected to its respective driving wheel 10, 11 through a rod 101, 111.

In addition, the above-mentioned 180° phase shift, particularly visible in FIG. 4, consists in rotatably mounting about an axis integral with and projecting with respect to the surface of the wheel 10 the end of the rod 101, while the end of the rod 111 is rotatably mounted about an axis integral with and projecting with respect to the surface of the wheel 11, said axes being arranged mechanically opposite each other, on both sides of the respective axes 100, 110 of rotation of said wheels 10, 11.

Preferably, said axes are located symmetrically with respect to the gearing point between the wheels 10 and 11. In addition, the wheels 10, 11 are aligned in one and the same plane, in order to align the pistons 80, 90 and arrange them above each other, avoiding a bend.

In this respect, it should be noted that the various wheels 10, 11, 12 and 130 have at the periphery toothings of complementary shapes and dimensions, in order to permit their coupling through gearing.

According to an additional feature, according to the embodiments shown in FIGS. 2 to 5, said gearing means 7 comprise a gearing disc 16, the latter being crenellated as a toothing of shapes and dimensions complementary to the toothing of said gearing wheel 12. Moreover, said disc 16 is provided with means for fastening to said crank set 200, in particular with its plate 201 namely of a larger size, said disc 16 and said plate 201 being therefore made integral.

According to the preferred embodiment, the gearing disc 16 is in the form of an annular crown, crenellated at the periphery and made integral with the plate 201 by a pair of screw and nut passing through corresponding apertures provided for in front of each other in said plate 201 and in said disc 16. This mounting occurs so as to arrange the disc 16 outwardly with respect to the crank set 200. It should be noted that the disc 16 also has an outer diameter larger than the diameter of said plate 201.

According to a particular embodiment, said disc 16 is in the form of a crown with 240 teeth, while the gearing wheel 12 comprises 40 teeth. The knurled wheel of the multiplier has, in turn, 13 teeth. These specific toothings permit to obtain a transmission ratio of 18/46.

Figure 6:
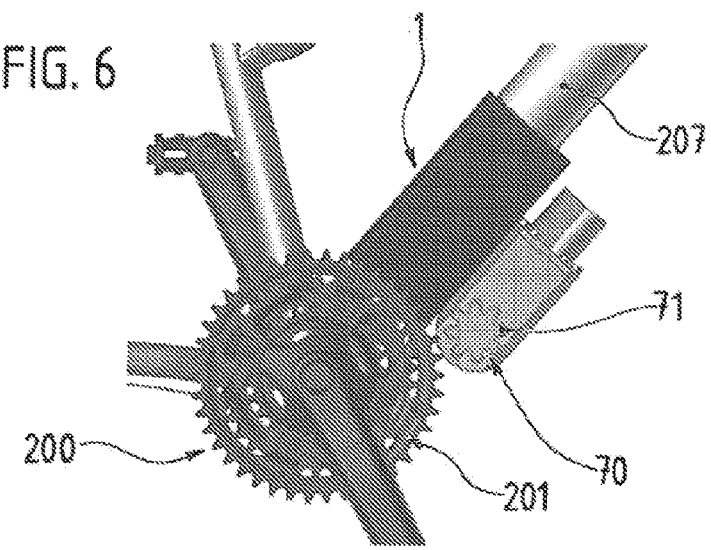
FIG. 6 schematically represents a view of another, different embodiment of the device in uncoupled position.

According to another embodiment, represented in FIGS. 6 to 8, the gearing with the plate 201 of the crank set 2 occurs directly, without the disc 16. To this end, the gearing means 7 comprise one single wheel 70 instead of the gearing wheel 12, without the intermediacy of the knurled wheel 130 of the multiplier 13.

According to a first variant, shown in FIGS. 6 and 7, said wheel 70 has a specific and complementary shape, so as to cooperate directly with the plate 201. In particular, said wheel 70 has a toothing 71 formed of teeth 10 aimed at cooperating complementarily with the pointed toothing of the plate 201. In particular, the teeth 71 of the wheel 70 can have an oblong shape, such as lobes.

According to another embodiment, represented in FIG. 8, said wheel has a toothing 70, which a small chain 72 with links cooperates with. This small chain 72 is similar to the chain 204 but with a shorter length. It preferably comprises identical links.

In short, the chain 72 is mounted in gear with the toothing of the wheel 70, so as to, on the one hand, make it integral around said wheel 70 and, on the other hand, permit the toothing of the plate 201 to come into gear with said chain 72, instead of the toothing of the wheel 70.

According to a specific embodiment, said chain 72 comprises fourteen links.

Moreover, in use, the chain 204 of the bicycle 2 is positioned on a plate other than the plate 20, leaving the latter free for receiving the gearing of the wheel 70. Once the latter is in gear, since the chain 204 is located on a plate of smaller dimensions, the driving and finally the compression require less effort by the rider. In addition, the rotational torque ratio ensures a force capable of compressing the air inside the chambers 8, 9 with the required pressure.

In addition, said wheel 70 can be mounted on a pawl, avoiding no resistance in case of pedaling rearwards and limiting the resistance when stopped. The wheel 70 can also be provided in a disengageable way.

Thus, any type of plate 201 having a standardized toothing can cooperate in gearing with the chain 72 and the wheel 70, ensuring a universal compatibility of the device with all the existing bicycles 2. This compatibility permits to easily mount and adjust the device 1 on the bicycle 2 with neither adding any part at the level of the crank set 201 nor modifying the structure of said bicycle 2.

Thus, in operation, the rotation of the crank set 200 causes the gearing disc 16 to rotate at the same speed. The coupling with the gearing wheel 12 or the wheel 70 causes it to rotate and be driven at a higher speed of rotation, namely through the knurled wheel 130, the wheel 10 for driving the piston 8 and, under the action of the latter, the wheel 11 for driving the piston 9. The pistons 80, 90 then move in translation and perform together their compression operation, the first piston 80 transferring the air it compresses from the chamber 8 to the chamber 9, when the piston 90 returns, before its compression phase, through the 180° shift.

According to an additional feature, the device 1 comprises means (not shown) for controlling the coupling in gearing of said gearing wheel 12 with said disc 16 and permitting to manually engage and disengage said coupling. According to an embodiment, shown in FIGS. 6 and 7, part of the device 1 is mounted and driven in translation, so as to pass from a disengaged position to a position engaged with the crank set 200, and vice-versa.

In addition, said control means can comprise means for measuring the internal pressure of said cartridge 3 or said "high-pressure" chamber 9, controlling automatically the disengagement of the coupling between the disc 16 and the wheel 12, beyond a determined threshold. In particular, this threshold corresponds to a maximum pressure value corresponding to the filling of the cartridge 3. Beyond this threshold pressure, the disengagement is started, separating the disc 16 from the wheel 12.

In addition, a valve can be added, in order to release the compressed-air flow when said threshold pressure is exceeded, namely beyond 35 bars.

Furthermore, the device 1 is at least partly surrounded by a protective shell 17, namely at the level of the gearings of the wheels 10, 11 and the movement of the rods 101, 111, which protects these elements and avoids any danger for the user during operation when these mechanical parts are moving.

In this respect, the parts forming the device 1 can be made of plastic and/or composite and/or metallic material, namely aluminum, in order to reduce their weight. These parts can also receive a particular surface treatment increasing their strength and lifetime.

Thus, the device 1 according to the invention ensures the compressed-air storage through a compression by two high- and low-pressure pistons 80, 90 operating simultaneously and in combination, thus facilitating the high-pressure compression.

In addition, the operation of said device 1 is ensured during pedaling, but also when pedaling backwards, i.e. in both directions of rotation of the crank set 200.

What is claimed:

1. A compressing device for air for a bicycle being provided with a driving crank set, said device comprising:
    a compressed-air storage cartridge; and
    compression means connected to the cartridge, said compression means comprising:
        means for gearing with said crank set, and
        a first compression chamber and a second compression chamber, each compression chamber being provided with an air piston,
    wherein said means for gearing are connected to each piston and driving a translation stroke of each piston in order to put a respective chamber under compression, and wherein said first chamber is connected to said second chamber so as to transfer compressed air within said first chamber to said second chamber during compression of said second chamber.

2. The compressing device, according to claim 1, wherein said means for gearing comprise a first wheel for driving said first piston and a second wheel for driving said second piston,
    wherein each piston is mounted articulated eccentrically with a respective wheel so as to constitute a respective mechanical rod-crank system, and
    wherein said means for gearing further comprises: a third wheel mounted and in rotating engagement with said first wheel and said second wheel.

3. The compressing device, according to claim 2, wherein said means for gearing comprise a gearing disc provided with means for fastening to said crank set, said gearing disc being crenellated as a toothing of shapes and dimensions complementary to toothing said third wheel.

4. The compressing device, according to claim 2, wherein said third wheel is comprised of:
    one single wheel having a specific and complementary shape, so as to cooperate directly in gear with toothing of a plate, and
    oblong teeth.

5. The compressing device, according to claim 2, wherein said third wheel is comprised of:
    a wheel having a toothing, and
    a chain with links wound around said third wheel, said toothing being cooperative with said chain with links.

6. The compressing device, according to claim 3, further comprising: means for controlling coupling in gearing of said third wheel with said gearing disc so as to manually engage and disengage said coupling.

7. The compressing device, according to claim 1, wherein said first chamber comprises dimensions such that air pressure is lower than pressure of air compressed by said second chamber.

8. The compressing device, according to claim 7, wherein the first chamber is connected to the second chamber through a check valve permitting only passing through of compressed air from said first chamber to said second chamber.

9. The compressing device, according to claim 4, further comprising: means for controlling coupling in gearing of said third wheel with said plate so as to manually engage and disengage said coupling.

* * * * *